F. L. MORSE.
DRIVE CHAIN.
APPLICATION FILED JUNE 27, 1908.
1,105,288.
Patented July 28, 1914.
3 SHEETS—SHEET 1.
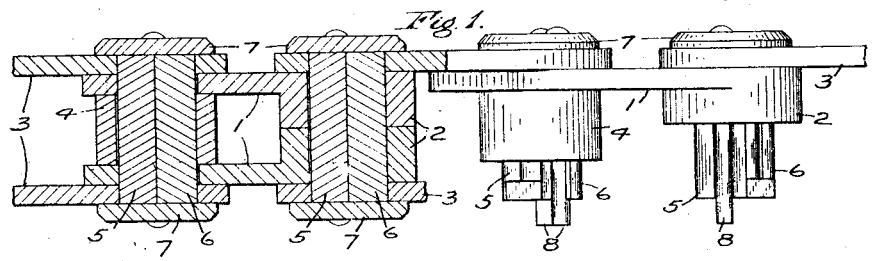
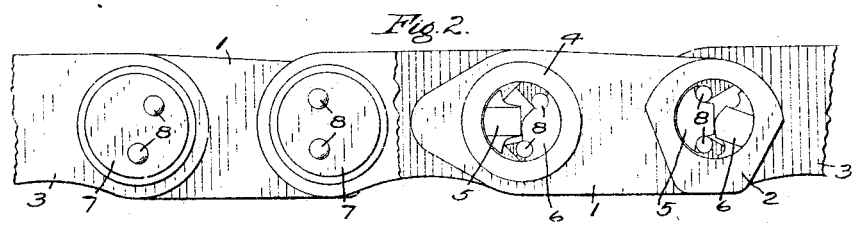
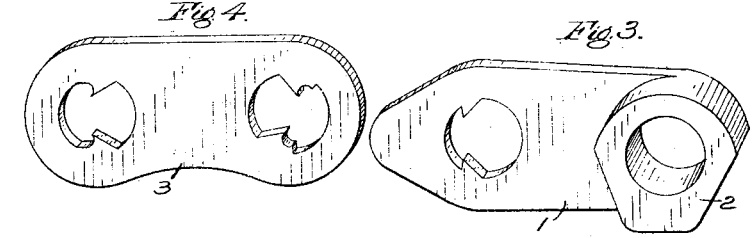
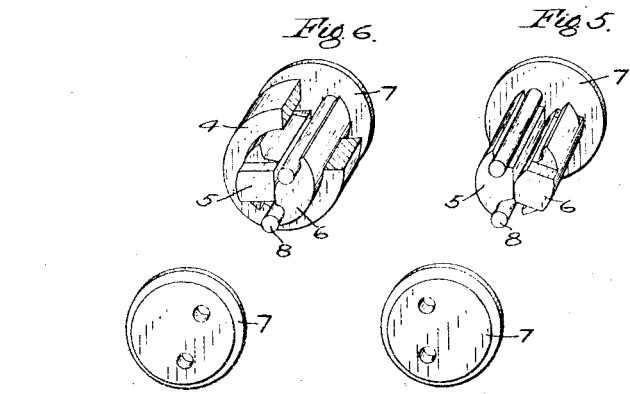
WITNESSES
Wm. M. Cady
J. S. Curtin
INVENTOR
Frank L. Morse
by E. H. Wright
Att'y

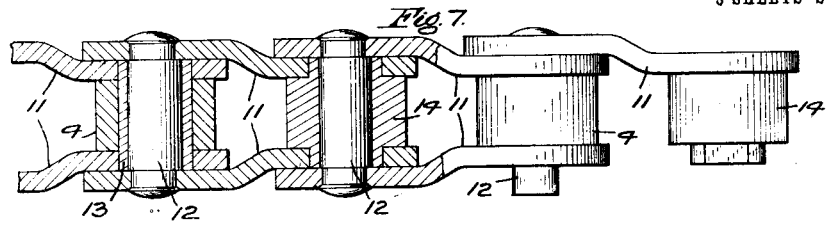
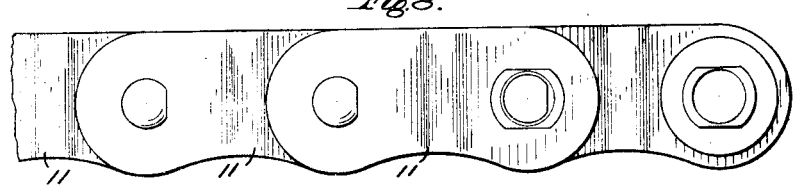
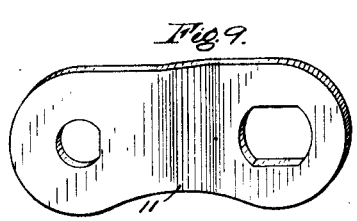 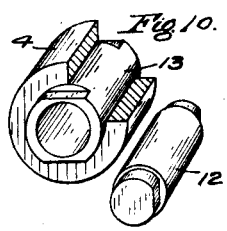 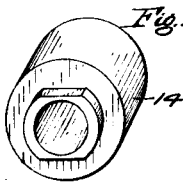
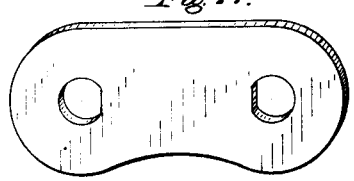 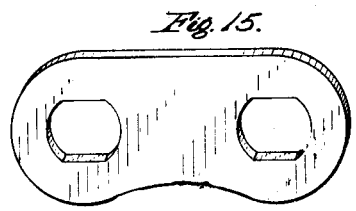
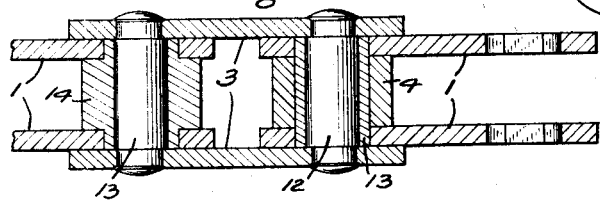 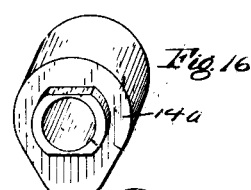
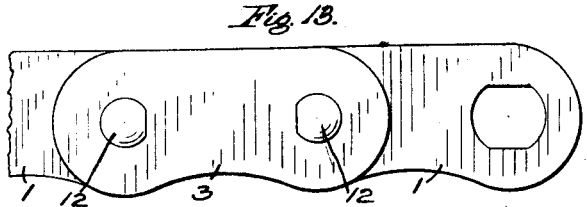 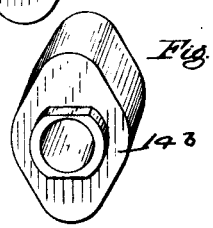

F. L. MORSE.
DRIVE CHAIN.
APPLICATION FILED JUNE 27, 1908.
1,105,288.
Patented July 28, 1914.
3 SHEETS—SHEET 3.
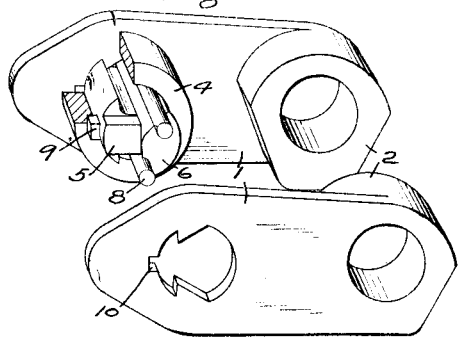
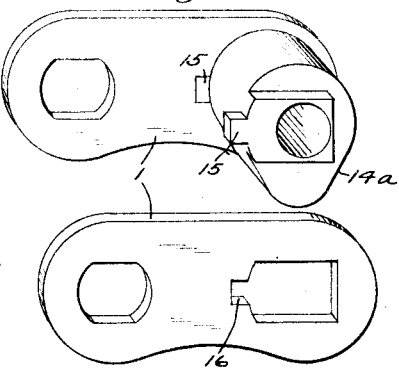
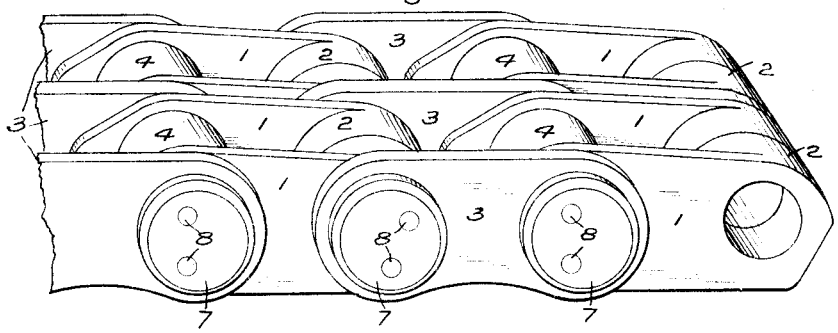
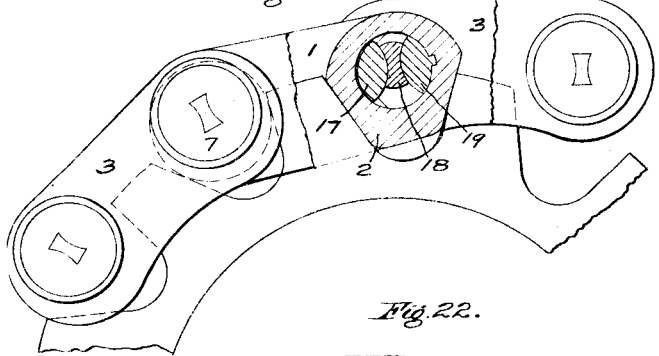
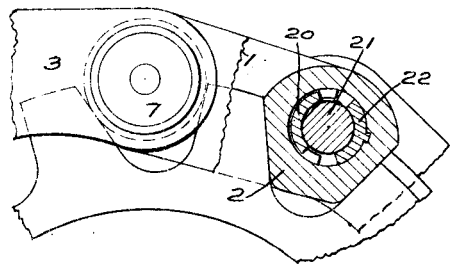
WITNESSES
INVENTOR
Frank L. Morse
by E. Wright
Att'y

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

DRIVE-CHAIN.

1,105,288.  Specification of Letters Patent.  Patented July 28, 1914.

Application filed June 27, 1908. Serial No. 440,735.

*To all whom it may concern:*

Be it known that I, FRANK L. MORSE, a citizen of the United States, residing at Ithaca, in the county of Tompkins and State of New York, have invented new and useful Improvements in Drive-Chains, of which the following is a specification.

This invention relates to drive chains and more particularly to what is known as the open link type of chain in which the links are formed of side plates spaced apart to accommodate the sprockets of the wheel, the sprockets being adapted to extend out between the plates and engage a spacing member or roller mounted on or surrounding the pintle part or parts at the joints. In chains of this type as heretofore used a roller has usually been employed on the pintle between the side plates at each joint for engaging the sprockets which are formed with curved bearing faces for engaging said rollers so that the line of pull may be substantially perpendicular to the bearing face at all points thereby insuring what is known as "root engagement" of the rollers with the sprockets. With this prior construction a curved depression is worn by the roller at the base of each tooth which causes the rollers of the chain to seat into these depressions with impact and thereby produce an objectionable snapping noise during the running of the chain. If this construction of chain having rollers at all joints, were used with compensating sprocket wheels having teeth formed with flat or plane bearing faces inclined at an angle to a radial line, such as are employed with compensating or silent chains, it will be evident that the chain tension would cause the rollers to immediately roll out the inclined face of the sprockets and over the top of the teeth.

It has also been proposed to construct chains of the open link type with silent heads for the sprocket engaging members, these being formed rigid or integral with the side plates of the links and surrounding the pintles, as shown in my prior pending application, Serial No. 279,631, filed September 22, 1905. These non-rotatable or rigid sprocket engaging members may be termed silent heads, and are adapted to engage straight sided sprockets in such a manner as to compensate for wear by engaging the teeth farther out from the base as the pitch lengthens and thereby produce a silent running chain. This form of construction however, may necessitate the use of bent side plates for the chain links which diminishes the strength and durability of the chain, and also involves certain difficulties in the process of manufacture which greatly increase its cost.

The principal object of my present invention is to combine the advantages of the silent running feature with the flexibility, durability and strength of the roller type of construction, and for this purpose I have provided a chain of the open link roller type but having a non-rotatable silent head rigid with the link plates at certain joints to engage the straight sided sprockets and thereby compensate sufficiently for the wear so as to produce a silent running chain.

According to a preferred construction a rigid or silent head may be provided at each alternate joint, but my invention is not limited to this alternate arrangement since it may be found that substantially the same advantages may be derived by providing a silent head every third or fourth joint or interspersed in some other arrangement, the essential feature being that there shall be a sufficient number of silent heads bearing at the same time upon the sprockets of a wheel to properly compensate for wear and prevent objectionable noise in the operation of the chain.

While my invention is more particularly designed to be applied in connection with open link chains having links formed of straight side plates, and joined by pintles formed in two or more parts, it is not necessarily limited to such construction since it may also be used in chains having links composed of bent side plates, and with pintles formed of a single pin member.

In the accompanying drawings Figure 1 is a part plan and part horizontal section of several links of a chain embodying a preferred form of my invention, two of the side plates being broken away to more clearly show the construction of the pintles; Fig. 2 a side elevation of the same; Fig. 3 a perspective view of one of the straight inside plates having a silent head formed rigid and integral therewith; Fig. 4 a perspective view of one of the outside plates of the adjacent link; Fig. 5 a perspective view of the pintle parts of the joint adapted to extend through the silent or rigid heads and the outside plates, the washer at one end being separated; Fig. 6 a perspective view of the parts of an adjacent joint in which the pintle parts are surrounded by a roller, the latter being shown partially cut away and the washer at one end being removed to more clearly illustrate the joint construction; Fig. 7 a part plan and part horizontal section, with one side plate removed, showing several links of modified chain construction having bent side plates and embodying my improvement; Fig. 8 a side view of the same; Fig. 9 a perspective view of one of the side plates; Fig. 10 a perspective view of the parts of one of the roller joints of this modification, the roller being partly cut away and the central pintle member being removed from its bushing; Fig. 11 a perspective view of one of the fixed or silent heads adapted to be rigidly mounted in the inside ends of some of the links; Fig. 12 a horizontal section of a piece of chain having links formed of straight side plates joined by single pin pintles and showing my improvement applied thereto; Fig. 13 a side view of the same; Fig. 14 a perspective view of one of the outside plates; Fig. 15 a similar view of one of the inside plates; Fig. 16 a perspective view of one form of silent or rigid head that may be employed in any of the desired chain structures; Fig. 17 a similar view of a modified form of silent head; Fig. 18 a perspective view of a chain link similar to that shown on Sheet 1, but having additional means for holding the rocker pin in the side plates, a part of the roller being cut away and one of the side plates slightly removed; Fig. 19 a similar view of a chain link showing a modified form of means fixing a silent head in the side plates; Fig. 20 a perspective view showing my improved chain duplicated laterally and adapted to run on a double set of sprockets; Fig. 21 a side view of the chain applied to a portion of a sprocket wheel, one joint being in section and showing a modified form of three part pintle; and Fig. 22 a similar view showing still another form of three part pintle joint that may be employed in connection with my improvements.

According to the construction illustrated in Figs. 1, 2 and 3 of the drawings I have shown the inside links composed of plates 1 having integral portions 2 extending inward and meeting together at one end of the link, thereby forming a fixed or silent head for spacing the side plates apart and surrounding the pintle parts of the joint for engaging the sprockets of the wheels. The pintles are preferably formed in two parts comprising a seat pin 5 having a substantially plane bearing face, and a rocker pin 6 engaging the seat pin with a rolling contact, both pintle parts extending through apertures at the ends of both the outside plates 3 and the inside plates 1 of adjacent links at each joint. The apertures at one end of the plates comprising the inside link are preferably formed as shown to hold in place and turn with the seat pin member 5 of the pintle while permitting free movement of the rocker pin 6 therein which also extends through the apertures in the outside plates of the adjacent link, these apertures being formed to hold in place and turn with the rocker 6 and permit free movement of the seat pin 5.

A roller 4 may be mounted on the pintle parts between the inside plates for engaging the sprockets and rivet pins 8 may be employed extending through the joint for riveting the outside washers 7 and holding the parts of the chain together, all as described and claimed in my co-pending application Serial No. 440,732, filed the same date as this application.

The integral projections 2 formed on the other ends of the inside plates and comprising the fixed or silent heads for engaging the sprockets also have an aperture which is preferably substantially cylindrical and through which pass both parts, the seat pin and rocker, of the pintle, the latter member being adapted to engage and turn with the silent head and inside plates while the seat pin 5 turns freely within the aperture of the silent head 2 and is fitted within the apertures in the outside plates of the adjacent link and turns therewith. These apertures in the outside plates are formed to provide sufficient clearance for the free movement of the rocker pins 6 therein which may be shouldered at their ends if preferred and may also be held in the apertures of the silent heads in any other suitable manner than by the simple frictional engagement shown, if desired. The seat pins may also be shouldered at their ends in the roller joints to give sufficient clearance in the apertures of the outside plates and if desired these pintle parts may be provided with additional projections 9 near each end for fitting into corresponding sockets 10 in the ends of the inside plates, as shown in Fig. 18, for more firmly holding these parts in position.

According to the modification shown in Figs. 7 to 11 inclusive the alternate silent head and roller construction is applied in connection with an open link chain having bent side plates so that all of the link plates 11 are alike, each having an inside end with an aperture into which the shouldered end of a silent or fixed head 14, or a sleeve 13 may be fitted, and an outside end through which the end of the cylindrical pintle 12 extends and to which it may be riveted. The pintles 12 turn with the outside end of the links and bear within the cylindrical openings in the fixed heads at each alternate joint and within the fixed sleeves 13 at each of the other joints, the rollers 4 being mounted to turn on the sleeves 13 between the side plates.

Figs. 12 to 15 inclusive show a similar construction applied in connection with a chain having links formed of straight outside plates 3 and inside plates 1, the shouldered ends of the silent heads being fixed in apertures at one end of each inside link and the fixed sleeves 13 rigidly mounted in the aperture at the other end of each of the inside links while the pintles 12 are riveted at both ends of each of the outside links.

The non-rotatable or silent heads may be of any suitable or preferred shape such as shown at 2, Fig. 2, 14, Fig. 11, 14ᵃ, Fig. 16, or 14ᵇ, Fig. 17, for engaging the face of the sprockets.

If desired the silent or fixed heads may be provided with additional projections 15 for fitting corresponding sockets 16 in the side plates, as shown in Fig. 19, for the purpose of more securely mounting the fixed heads in position.

Fig. 20 illustrates how the chain, such as is shown in Fig. 1, may be increased in width by a mere duplication of the links side by side and the extension of the pintle members to accommodate any desired width of chain adapted to run on wheels having a plurality of sets of sprockets.

Fig. 21 shows the manner in which the rollers and the fixed or silent head engage the sprockets, and also shows a modified form of three part pintle comprising two side parts 17 and 19 having convex bearing faces engaging opposite sides of the central bearing member 18, all of the pintle parts extending through the plates of the two adjacent links and the fixed heads on the rollers at each joint.

Fig. 22 illustrates a similar construction but shows a modified form of three part pintle in which the two side parts 20 and 22 are provided with concave bearing faces engaging the cylindrical central pin 21 which is adapted to rotate in the bearing.

In the constructions shown in both Figs. 21 and 22 the central pin member of the joint may be provided with shouldered ends adapted to be riveted to the outside washers 7 for holding the parts of the chain together, as fully described in my co-pending application Serial No. 440,733, filed as of the same date as this application.

From the foregoing description it will now be apparent that the fixed or silent heads for engaging the sprockets may be formed integral with the side plates of the links, or may be rigidly mounted with said plates so as to be non-rotatable.

According to the preferred construction, as shown in the drawing, and as before stated, a fixed or non-rotatable silent head is located at each alternate joint, but it may be found in some cases that the advantages of my improvements may be obtained by using a fixed or silent head only at each third or fourth joint, or at some other interval, there being a sufficient number of such heads in engagement with the sprockets at all times to insure sufficient frictional contact between the chain and the wheel to provide proper compensation. By means of this construction also straight side plates may be used for the links, and these having the silent heads formed integral therewith may be readily and cheaply constructed by ordinary machining methods thereby greatly increasing the strength and durability of the chain, as well as reducing the cost of manufacture.

Having now described my invention, what I claim as new and desire to secure by Letters Patent is:—

1. A drive chain adapted to run upon compensating sprockets and having links composed of side plates, pintles joining said links, rotatable sprocket engaging members on some of said pintles, and non-rotatable members interspersed with said rotatable members upon other pintles of said chain.

2. A drive chain adapted to run upon compensating sprockets and having links composed of side plates, rotatable sprocket engaging members located between said side plates, and other non-rotatable sprocket engaging members interspersed with said rotatable members.

3. A drive chain adapted to run upon compensating sprockets and having adjacent links composed of outside plates and inside plates respectively, pintles connecting said plates, rollers mounted on some of said pintles, and non-rotatable sprocket engaging members interspersed with the rollers upon the other pintles.

4. A drive chain adapted to run upon compensating sprockets and having adjacent links composed of outside plates and inside plates respectively, pintles connecting said plates, and alternate rotatable and non-rotatable sprocket engaging members on said pintles.

5. A drive chain having links composed of side plates, pintles joining said links, rotatable sprocket engaging members on some of said pintles, and rigid heads having bearing faces for engaging straight sided sprockets interspersed with the rotatable members upon other pintles of the chain.

6. The combination with a sprocket wheel having straight sided teeth, of a drive chain having links composed of side plates, pintles joining said links, rollers mounted on some of said pintles and engaging said bearing faces, and heads rigid with the side plates and also engaging the bearing faces of said teeth, the rigid heads being interspersed with the rollers upon the pintles.

7. The combination with a sprocket wheel having compensating teeth with inclined bearing faces, of a drive chain having links composed of side plates, pintles joining said links, rollers mounted on some of said pintles and engaging said bearing faces, and rigid heads interspersed with the rollers upon the other pintles and also engaging the bearing faces of said teeth.

8. A drive chain adapted to run upon compensating sprockets and having adjacent links composed respectively of straight outside plates and straight inside plates, pintles connecting said links, non-rotatable or silent sprocket engaging members or heads rigid with the plates of the inside links at some of the pintle joints, and rotatable sprocket engaging members or rollers at the other pintle joints, the fixed heads being interspersed with the rollers.

9. A drive chain having adjacent links composed of outside plates and inside plates respectively, pintles connecting said links, the inside plates having integral lateral extensions around the pintle at one end of the link, thereby forming a fixed head or sprocket engaging member, and a roller on the pintle at the opposite end of such links.

10. A drive chain having links composed of side plates spaced apart, pintles formed in a plurality of parts extending through said plates and adapted to turn one upon another, non-rotatable sprocket engaging members surrounding the pintle parts at some of the joints, and rollers surrounding the pintle parts at the other joints.

11. A drive chain having links composed of side plates, the plates of some of the links having rigid sprocket engaging members or heads, pintles formed in two parts extending through openings in each head and side plates of both adjacent links, the openings in said heads being formed to engage with one part of the pintle and allow free movement of the other pintle part.

12. A drive chain adapted to run upon compensating sprockets and having each alternate link composed of two outside plates, and each intermediate link of two inside plates, pintles for connecting said links, fixed silent heads surrounding the pintles of certain joints for engaging the sprockets, and rollers mounted on the pintles of the other joints interspersed between joints having fixed heads.

13. A drive chain adapted to run upon compensating sprockets and having each alternate link composed of two outside plates, and each intermediate link of two inside plates, pintles for connecting said links, fixed silent heads rigidly mounted with the inside plates and surrounding the pintles at each alternate joint for engaging the sprockets, and rollers mounted on the pintles of the other joints.

14. A drive chain having each alternate link composed of two outside plates, and each intermediate link of two inside plates, pintles for connecting said links, fixed silent heads having substantially flat bearing faces for engaging the sprockets and located at the pintles of certain joints, and rollers mounted on the pintles at other joints.

15. A drive chain having each alternate link composed of two outside plates, and each intermediate link of two inside plates, pintles for connecting said links, silent heads formed integrally with the inside plates and surrounding the pintles at each alternate joint, and rollers mounted on the pintles at other joints.

16. A drive chain having each alternate link composed of two outside plates, and each intermediate link of two inside plates, pintles for connecting said links, said pintles being formed in a plurality of parts extending through apertures in the plates of both adjacent links and bearing one upon another throughout their length, and fixed silent heads surrounding the pintle parts of certain joints for engaging the sprockets.

17. A drive chain having each alternate link composed of two outside plates, and each intermediate link of two inside plates, pintles for connecting said links, said pintles being composed of a seat pin and rocker extending through apertures in the plates of both adjacent links and bearing upon each other, and fixed silent heads surrounding the pintle parts of certain joints for engaging the sprockets.

In testimony whereof I have hereunto set my hand.

FRANK L. MORSE.

Witnesses:
R. F. EMERY,
WM. M. CADY.